United States Patent
Kanner

(10) Patent No.: US 8,477,067 B2
(45) Date of Patent: Jul. 2, 2013

(54) VEHICLE LOCALIZATION SYSTEM

(75) Inventor: Abe Kanner, Mississauga (CA)

(73) Assignee: Thales Canada Inc., Toronto, Ontario (CA)

( * ) Notice: Subject to any disclaimer, the term of this patent is extended or adjusted under 35 U.S.C. 154(b) by 257 days.

(21) Appl. No.: 13/168,485

(22) Filed: Jun. 24, 2011

(65) Prior Publication Data

US 2012/0326924 A1    Dec. 27, 2012

(51) Int. Cl.
*G01S 19/46* (2010.01)

(52) U.S. Cl.
USPC .................................................. 342/357.29

(58) Field of Classification Search
USPC .................................................. 342/357.29
See application file for complete search history.

(56) References Cited

U.S. PATENT DOCUMENTS

| | | | |
|---|---|---|---|
| 6,104,978 A | | 8/2000 | Harrison et al. |
| 6,135,396 A | | 10/2000 | Whitfield et al. |
| 7,131,614 B2 | | 11/2006 | Kisak et al. |
| 8,296,065 B2 | * | 10/2012 | Haynie et al. ............... 701/505 |
| 2003/0236598 A1 | | 12/2003 | Villarreal Antelo et al. |
| 2006/0212183 A1 | * | 9/2006 | Wills et al. ................. 701/19 |
| 2008/0231506 A1 | | 9/2008 | Stull et al. |
| 2010/0235022 A1 | * | 9/2010 | Siddappa et al. ............ 701/20 |
| 2012/0303271 A1 | * | 11/2012 | Chowdhary et al. ......... 701/433 |

FOREIGN PATENT DOCUMENTS

| | | |
|---|---|---|
| JP | 2004168216 A | 6/2004 |
| KR | 2011124399 A | 11/2011 |
| WO | 9109275 A2 | 6/1991 |
| WO | 2012007822 A1 | 1/2012 |

OTHER PUBLICATIONS

Ackroyd, "Remote Ride Quality Monitoring of Acela Train Set Performance", IEEE 2002.
GPS Signal Re-Radiating in Tunnel Networks, SAT MAGAZINE.COM, Sep. 2008, Case Study, p. 1-4.

* cited by examiner

*Primary Examiner* — Harry Liu
(74) *Attorney, Agent, or Firm* — Marks & Clerk; Richard J. Mitchell

(57) ABSTRACT

A localization system for a vehicle running on a guideway including portions obscured from satellite view has a number of GNSS receivers placed at strategic locations along the guideway in view of navigation satellites. GNSS transmitters retransmit received GNSS signals along an obscured portion of the guideway. Coded targets are placed at known locations along the guideway. A GNSS receiver on the vehicle picks up GNSS signals directly from the navigation satellites or retransmitted from the GNSS transmitters when on an obscured portion of the guideway. A proximity sensor on the vehicle detects the coded targets. An on-board computer synchronizes the location obtained from the GNSS signals with the location obtained from the proximity sensor. The vehicle is thus able to determine its position even in an obscured portion, such as a tunnel.

16 Claims, 2 Drawing Sheets

Note: T1 coded for uptrack
T2 coded for downtrack

VEHICLE LOCALIZATION SYSTEM

FIELD OF THE INVENTION

The present invention relates to the field of vehicles running on a guideway, such as trains, and in particular to a vehicle location system using GNSS signals.

BACKGROUND OF THE INVENTION

Global navigation satellite systems (GNSS), such as the Global Positioning System (GPS) provide accurate position information when a sufficient number of satellites are in view. Hereafter, for convenience the invention will be described in the context of GPS, but it will be appreciated that other GNSS systems, such as the Russian GONAD system, or the European Galileo system can be employed.

The use of GPS systems in relation to vehicles running on a guideway gives rise to two problems. First, the accuracy of the location/positioning of the non-military available GPS signals is not sufficiently precise for ensuring accurate station stops, the location of switches on the guideway, locating the end of guideway etc. Second, GPS signals are not available in tunnels. This results from the nature of GPS systems, which are based on direct viewing of satellites in the sky. These problems prevent the use of readily available GPS-based positioning solution to exclusively determine train position in Railway/Transit applications.

Current solutions make use of RFID (Radio Frequency Identification) transponders to provide absolute location information to trains in the system including in a tunnel. This solution requires the installation of RFID transponders along the guideway and a reader on the train to provide position information. The position of the train between RFID transponders is determined by dead reckoning.

Other systems use inductive loop communication together with inductive loop cable transpositions (crossovers) to provide relative positioning information. On-board crossover detection equipment evaluates and counts the number of transpositions (crossovers) from the starting point of the inductive loop. This provides relative positioning/location information to the on-board system. The position of the train between transpositions(crossovers) is provided by dead reckoning.

These solutions are expensive both in terms of hardware and software and cannot be justified in certain applications. The limitation of the current GPS solution limits the option of providing a low cost "off-the-shelf" solutions based on readily available GPS devices.

SUMMARY OF THE INVENTION

Embodiments of the present invention overcome the above deficiencies via the use of a secondary positioning system that synchronizes the GPS information in the on-board computer, thus allowing the use of GPS signals for Railway/Transit applications and other guided vehicle applications.

According to the present invention there is provided a localization system for a vehicle running on a guideway including portions obscured from satellite view, comprising at least one GNSS receiver placed at one or more strategic locations in view of navigation satellites; GNSS transmitters for retransmitting received GNSS signals along an obscured portion of the guideway; coded targets placed at known locations along the guideway; a GNSS receiver on the vehicle for picking up GNSS signals directly from the navigation satellites or retransmitted from the GNSS transmitters when on an obscured portion of the guideway; a proximity sensor on the vehicle for detecting the coded targets; and an on-board computer for synchronizing the location obtained from the GNSS signals with the location obtained from the proximity sensor.

The secondary system allows the synchronization of the GNSS, hereinafter referred to as GPS, signals received by the on-board computers with an onboard database and known fixed location markers via the use of train mounted proximity sensors and coded targets placed in the guideway between the running rails.

The use of the secondary detection system also allows GPS signals to be used in tunnels by synchronizing are-radiated GPS signal from outside of the tunnel coupled with the known fixed position location information based on proximity sensors detecting coded targets within the tunnel and an onboard database. The combination of the re-radiated GPS signal and the fixed known position of targets contained within an on-board database accurately provides absolute position of the train in the tunnel. The position of the train between synchronization points is provided by dead reckoning.

As an added benefit, in providing are-radiating GPS signal in the tunnel it can be assured that the GPS system remains active and can re-acquire without delay the GPS satellites signal on the exit of the train from the tunnel.

BRIEF DESCRIPTION OF THE DRAWINGS

The invention will now be described in more detail, by way of example only, with reference to the accompanying drawings, in which.

DETAILED DESCRIPTION OF THE INVENTION

The invention will be described in the context of trains running on tracks, but it will be understood that it is equally applicable to other guided vehicle transport technologies.

Train location information outside of tunnels is provided by location information from GPS signals, an on-board database and dead reckoning whenever the GPS signal is unavailable or between reads of the GPS signal. However, GPS location information is not available in tunnels. Thus the absolute location needed for a train within a tunnel is lost when the train enters the tunnel.

In order to alleviate the unavailability of the GPS signals and provide accurate positioning information at specific locations and in tunnels, fixed GPS antennas/receivers are placed at critical locations outside the tunnel in full view of the navigation satellites. These signals are then re-transmitted via fiber to GPS signal transmitters within the specified location.

These signals can then be read by GPS receivers on board the train to provide location information.

However due to the nature of the GPS signals the accuracy of the absolute position at the synchronization point cannot be guaranteed due to the nature of the propagation of the radio signal and the accuracy of the GPS signal itself. Proximity sensors and passive coded targets enhance the accuracy of the location information.

The train is equipped both with the GPS receiver and with proximity sensors that can detect coded targets placed in exact predetermined locations. This allows the train's on-board computer to synchronize location obtained from the GPS signal with the proximity sensor detecting the coded target placed between the rails on the guideway.

The on-board computer synchronizes the location obtained by the received GPS signal and the detection of the coded targets by the proximity sensors according to a location database stored in its memory and places the train at the accurate absolute position. Position information between detection points or reads of the GPS signal can be provided by dead reckoning.

Figure 1:
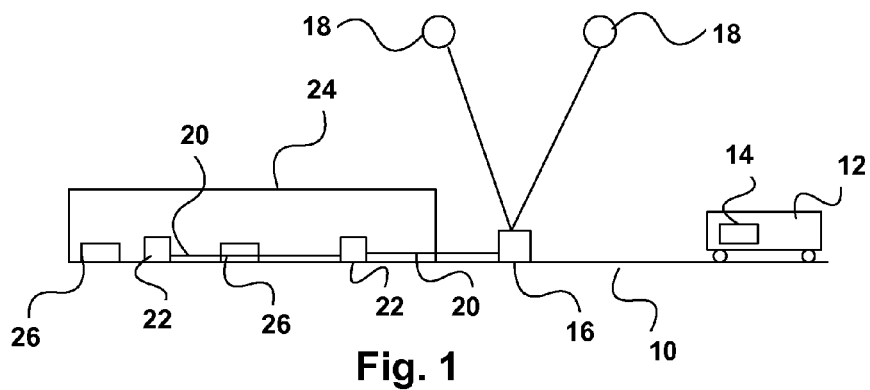
FIG. 1 is a schematic illustration of a guideway with a localization system in accordance with one embodiment of the invention.

A specific embodiment is described with reference to FIG. 1, which shows a track 10 with train 12 moving along it. The train includes an on-board localization system 14. A fixed GPS receiver 16, which in this example is beside the track 10, receives GPS signals from in-view navigation satellites 18. These signals are then relayed over optical fibers 20 to re-transmitters 22 placed at points within tunnel 24, where the satellites 18 are obscured from view. The signals from the re-transmitters 22 are picked up by a receiver on board the train 12.

Figure 2:
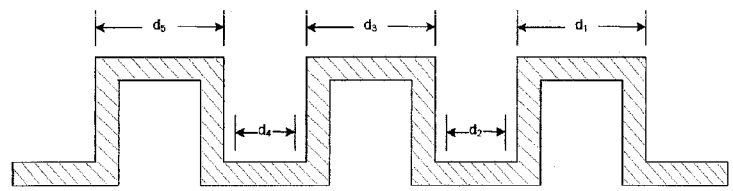
FIG. 2 is a diagram showing the configuration of a coded target.

Additionally, coded targets 26 are placed at known locations within the tunnel 24. The coded targets can be passive locating metal plates with ridges and valleys that provide for the detection signal to the proximity sensor. In one embodiment each plate provides three ridges and two valleys for the detection, with the center of the middle ridge providing the exact location of the synchronization point detected by the GPS as shown in FIG. 2.

The dimension of each of the ridges and valleys are variables and used to code the location for different guideway configuration. The timing of the detection of the ridges and valleys by the on-board computer serves as the identification of the reference point for the coded target.

Figure 3:
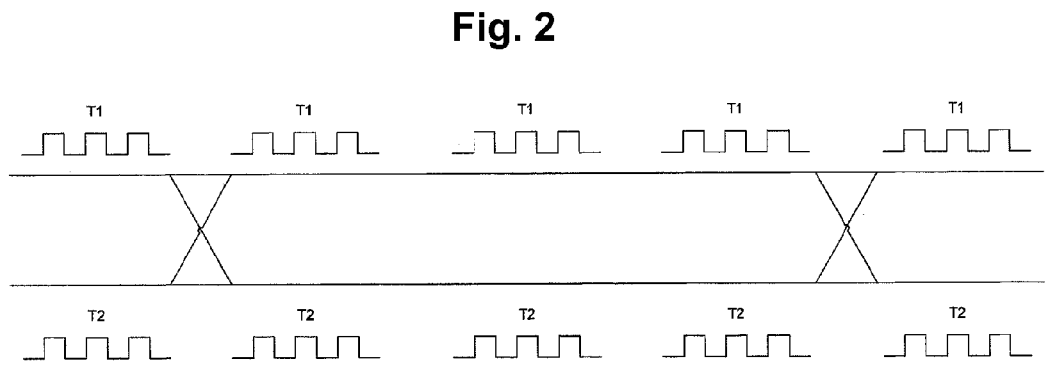
FIG. 3 is a diagram showing the layout of coded targets on a two-way track.

An example for a two-track configuration with an inbound and outbound guideway is shown in FIG. 3. In this case, the size of the ridges and valleys T1 or T2 is two centimeters on the inbound track and three centimeters in the outbound track.

The timing of the detection in timing between the three centimeter target and the two centimeter target issued to determine the reference location in the inbound vs. outbound track.

Figure 4:
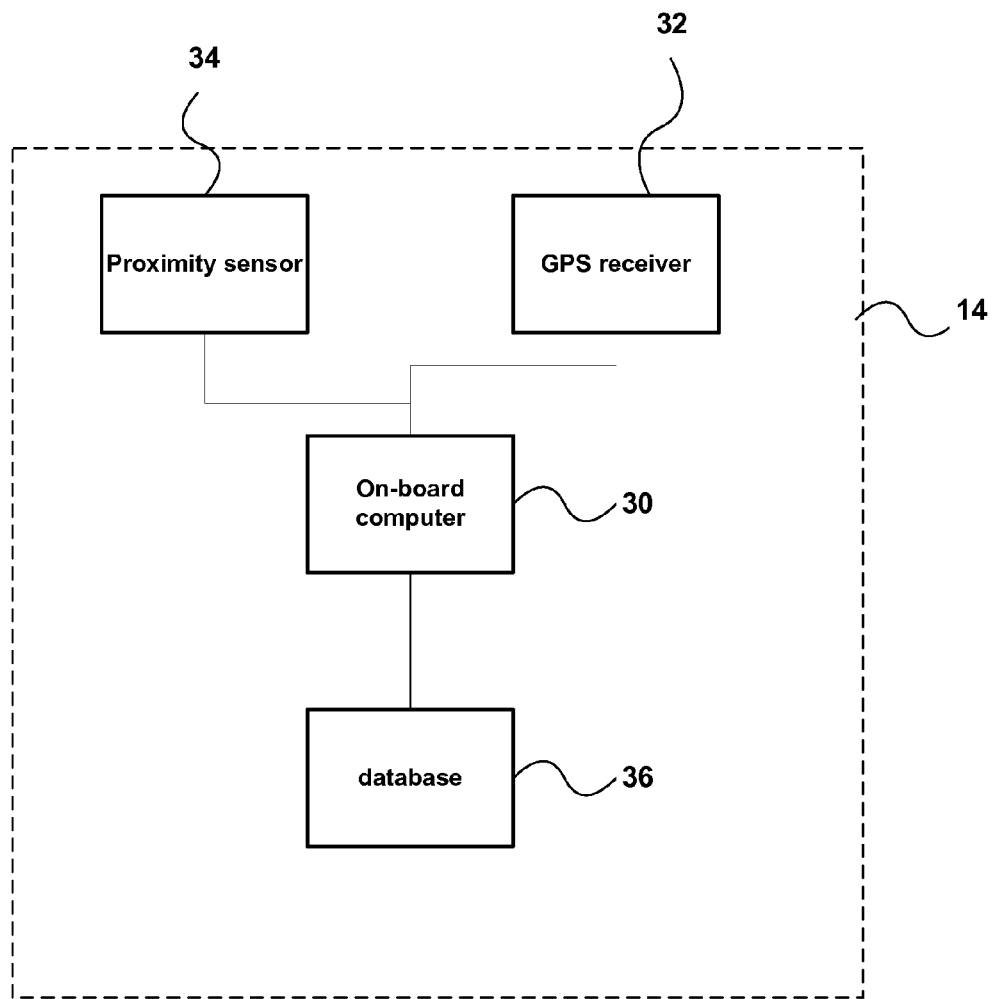
FIG. 4 is a high-level block diagram of an on-board computer system.

FIG. 4 is a block diagram of the on-board computer system. This comprises an on-board computer 30 connected to GPS receiver 32, proximity sensor 34, and database 36.

When the train enters the tunnel 24, the satellites 18 are no longer in view. The GPS receiver 32 picks up the signals from the re-transmitters 22 and calculates the position. However, there is some uncertainty as to the significance of the signals due to the fact that they are re-transmitted over optical fibers 20. When the proximity sensor 34 passes a particular coded target 26, the computer decodes the signal and determines the location of the train by looking up the code in the database 38. By synchronizing the location of the train as determined from the coded targets 26, the computer is able to account for the fact that the GPS signals are re-transmitted over the optical fibers.

Once this has been done, the computer 30 can then calculate a precise position based on the GPS signals between the coded targets. Between reads of the GPS signals, the computer can estimate the position of the train by dead reckoning.

Another advantage of this arrangement is that when the train emerges from the tunnel, the GPS receiver is still synchronized with the GPS signals, so there is no re-synchronization delay in continuing to obtain position information from the GPS signals.

The embodiment described provides for the use of low cost positioning/location system for accurately locating trains in the system including tunnels with the use of a low cost GPS signals and a number of coded targets to establish precise train position in critical locations and in tunnels throughout the system. This solution replaces the more expensive use of on board the train RFID transmitters/recovers and wayside transponders used for positioning/location.

The invention claimed is:

1. A localization system for a vehicle running on a guideway including portions obscured from satellite view, comprising:
   at least one GNSS receiver placed at one or more strategic locations in view of navigation satellites;
   GNSS transmitters for retransmitting received GNSS signals along an obscured portion of the guideway;
   coded targets placed at known locations along the guideway;
   a GNSS receiver on the vehicle for picking up GNSS signals directly from the navigation satellites or retransmitted from the GNSS transmitters when on an obscured portion of the guideway;
   a proximity sensor on the vehicle for detecting the coded targets; and
   an on-board computer for synchronizing the location obtained from the GNSS signals with the location obtained from the proximity sensor.

2. A localization system as claimed in claim 1, wherein the on-board computer is configured to obtain the location from the proximity sensor by looking up the target code in a database carried on board the vehicle.

3. A localization system as claimed in claim 1, wherein the on-board computer is configured to determine the location of the vehicle between targets in the obscured portion of the guideway from the retransmitted GNSS signals.

4. A localization system as claimed in claim 3, wherein the location of the vehicles between GNNS reads and between coded targets is determined by dead reckoning.

5. A localization system as claimed in claim 1, wherein the coded targets comprise locating plates with ridges and valleys.

6. A localization system as claimed in claim 5, wherein the guideway is two-way, and the spacing of the ridges and valleys is different in the two directions.

7. A localization system for a vehicle guideway including portions obscured from satellite view, comprising:
   at least one GNSS receiver placed at one or more strategic locations in view of navigation satellites;
   GNSS transmitters for retransmitting received GNSS signals along an obscured portion of the guideway; and
   coded targets placed at known locations along the guideway;
   whereby an on-board computer on the vehicle synchronizes the location obtained from the GNSS signals with the location obtained from the proximity sensor.

8. A localization system as claimed in claim 7, wherein the coded targets comprise locating plates with ridges and valleys.

9. A localization system as claimed in claim 8, wherein the guideway is two-way, and the spacing of the ridges and valleys is different in the two directions.

10. A localization system as claimed in claim 7, wherein the GNSS signals are transmitted from the at least one GNSS receiver to the GNSS transmitters by optical fiber.

11. A vehicle localization system for mounting on a vehicle running on a guideway including portions obscured from satellite view, comprising:
- a GNSS receiver on the vehicle for picking up GNSS signals directly from the navigation satellites or when on an obscured portion of the guideway from GNSS retransmitted from GNSS transmitters placed at strategic locations along the guideway;
- a proximity sensor for detecting coded targets placed at known locations along the guideway; and
- an on-board computer for synchronizing the location obtained from the GNSS signals with the location obtained from the proximity sensor.

12. A localization system as claimed in claim 11, wherein the on-board computer is configured to obtain the location from the proximity sensor by looking up the target code in a database carried on board the vehicle.

13. A localization system as claimed in claim 11, wherein the on-board computer determines the location of the vehicle between targets in the obscured portion of the guideway from the retransmitted GNSS signals.

14. A localization system as claimed in claim 13, wherein the on-board computer is configured to determine the location of the vehicle between GNNS reads and between coded targets by dead reckoning.

15. A localization system as claimed in claim 11, wherein the proximity sensor is responsive to coded targets comprising locating plates with ridges and valleys.

16. A localization system as claimed in claim 11, wherein proximity sensor is responsive to coded targets having different spacing of the ridges and valleys in different directions of motion along the guideway.

* * * * *